US012690569B2

(12) United States Patent (10) Patent No.: US 12,690,569 B2

Butler, III (45) Date of Patent: Jul. 28, 2026

(54) Q-LEASH SYSTEMS

(71) Applicant: GB3 Designs, LLC, Mesa, AZ (US)

(72) Inventor: George H. Butler, III, Mesa, AZ (US)

( * ) Notice: Subject to any disclaimer, the term of this patent is extended or adjusted under 35 U.S.C. 154(b) by 266 days.

(21) Appl. No.: 15/849,549

(22) Filed: Dec. 20, 2017

(65) Prior Publication Data

US 2018/0177157 A1 Jun. 28, 2018

Related U.S. Application Data

(60) Provisional application No. 62/515,969, filed on Jun. 6, 2017, provisional application No. 62/438,248, filed on Dec. 22, 2016.

(51) Int. Cl.
*A01K 27/00* (2006.01)
*A44B 13/02* (2006.01)

(52) U.S. Cl.
CPC ............ *A01K 27/005* (2013.01); *A44B 13/02* (2013.01); *A01K 27/001* (2013.01); *A01K 27/003* (2013.01)

(58) Field of Classification Search
CPC ..... A01K 27/00; A01K 27/003; A01K 27/005
USPC ......................... 119/792, 795, 798, 772, 776
See application file for complete search history.

(56) References Cited

U.S. PATENT DOCUMENTS

| | | | | | |
|---|---|---|---|---|---|
| 579,113 | A | * | 3/1897 | Lally | A01K 27/005 |
| | | | | | 119/776 |
| 2,821,169 | A | * | 1/1958 | Barhorst | A01K 27/005 |
| | | | | | 119/776 |
| 4,404,927 | A | * | 9/1983 | Woutat | A01K 27/005 |
| | | | | | 119/776 |
| 4,530,310 | A | * | 7/1985 | Clarke | A01K 27/005 |
| | | | | | 119/776 |
| 4,903,638 | A | * | 2/1990 | Lacey | A01K 27/005 |
| | | | | | 119/776 |
| 5,103,771 | A | * | 4/1992 | Lee | A01K 27/005 |
| | | | | | 119/776 |
| 5,125,365 | A | * | 6/1992 | Bonilla | A01K 27/005 |
| | | | | | 119/665 |
| 5,806,468 | A | * | 9/1998 | Ryder | A01K 27/005 |
| | | | | | 119/776 |
| 6,230,663 | B1 | * | 5/2001 | Welch | A01K 27/005 |
| | | | | | 119/772 |
| 7,367,287 | B1 | * | 5/2008 | Jones, Jr. | A01K 27/005 |
| | | | | | 119/798 |
| 8,434,429 | B2 | * | 5/2013 | Moeller | A01K 27/005 |
| | | | | | 119/779 |
| 9,273,718 | B2 | | 3/2016 | Fathi | |
| 2014/0262608 | A1 | | 9/2014 | Patel et al. | |
| 2016/0215812 | A1 | | 7/2016 | Durfee | |
| 2016/0249588 | A1 | | 9/2016 | Lajoie | |

* cited by examiner

*Primary Examiner* — David J Parsley
(74) *Attorney, Agent, or Firm* — Malcolm Pipes

(57) ABSTRACT

The present invention relates to providing a system which allows a user to attach, or detach, a leash to, or from, a pet's collar using only one hand, without the need to remove mittens or gloves in colder climates, without the need to touch or grasp a hot metal "D-ring" or other method of attachment on a collar in hot climates, but simply attaching the leash directly to the collar itself.

8 Claims, 5 Drawing Sheets

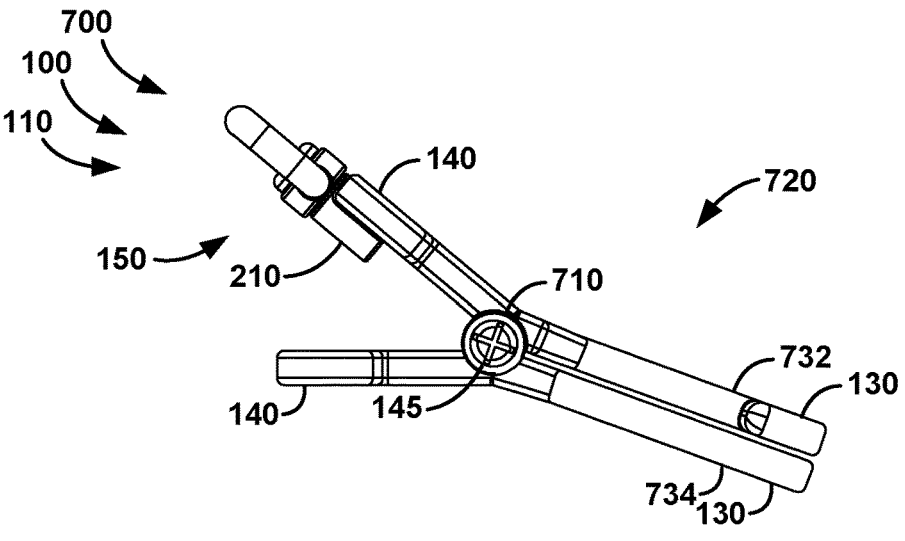
FIG. 7A
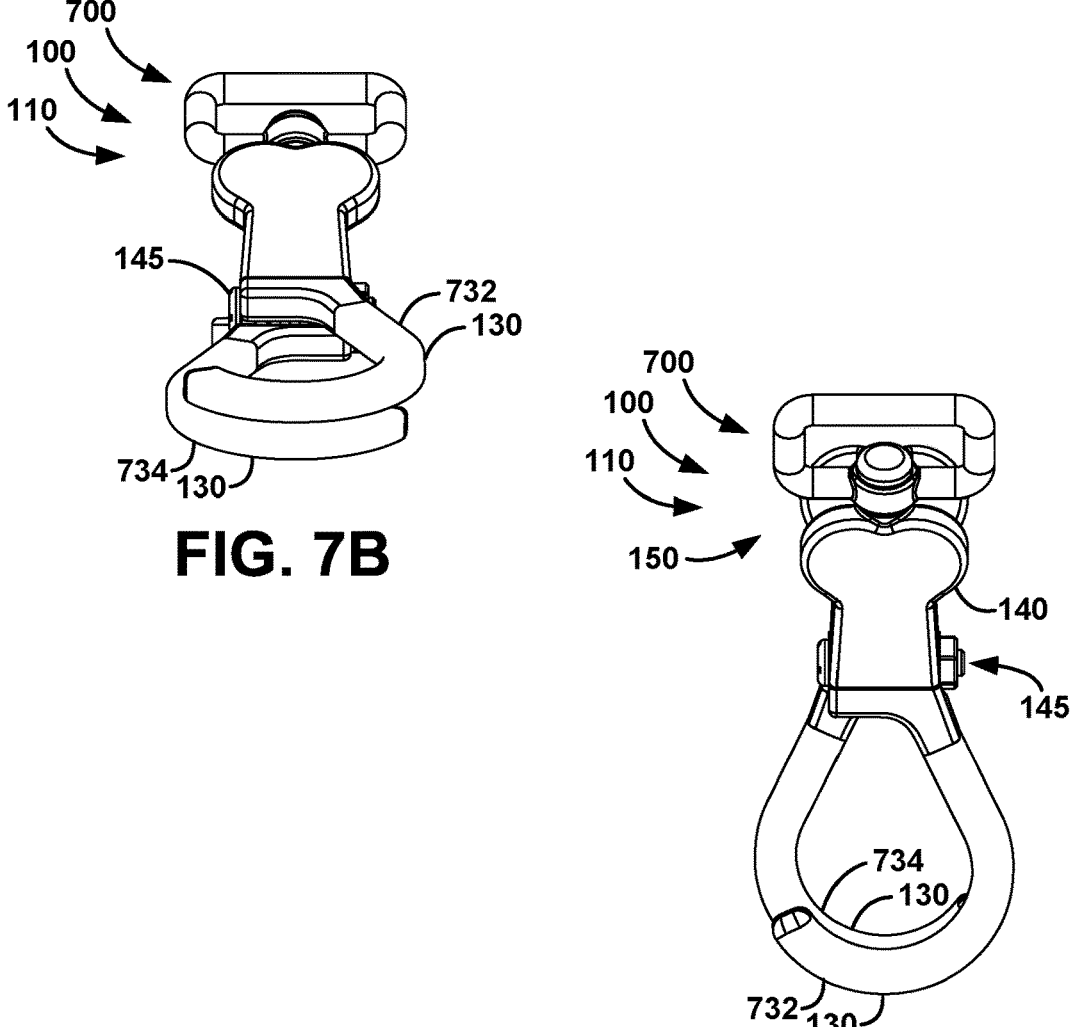
FIG. 7B
FIG. 7C

Q-LEASH SYSTEMS

CROSS-REFERENCE TO RELATED APPLICATION

The present application is related to and claims priority from prior provisional application Ser. No. 62/438,248, filed Dec. 22, 2016, entitled "EZ LEASH SYSTEM"; and, this application is related to and claims priority from prior provisional application Ser. No. 62/515,969, filed Jul. 6, 2017, entitled "Q-LEASH SYSTEM", the contents of both of which are incorporated herein by this reference and are not admitted to be prior art with respect to the present invention by the mention in this cross-reference section.

BACKGROUND

Generally, many people have pets that wear collars, and frequently may take those pets for walks in cold or hot climates. In order to place a leash on the pet, a person would have to remove any gloves from their hands, bend down and using two hands, attach the snap or hook of the leash to the "D-ring" on the collar of the pet. This can be a cumbersome task, especially in colder climates where a person must wear gloves or mittens on their hands to protect themselves from the cold, or even in hot climates where the metal "D-ring" would be hot to the touch. The present invention relates to providing a system for increased simplicity for attaching, or detaching, a leash to, or from, a pet's collar. More particularly the present invention relates to providing a system which allows a user to attach, or detach, a leash to, or from, a pet's collar using only one hand, without the need to remove mittens or gloves in colder climates, without the need to touch or grasp a hot metal "D-ring" or other method of attachment on a collar in hot climates, but simply attaching the leash directly to the collar itself. This allows a person to attach or detach a leash to, or from, a pet's collar without the need to remove gloves or mittens, without having to use one hand to hold onto the "D-ring" and the other to attach the leash by engaging the snap or hook with the "D-ring", and without the need to use the "D-ring" or other attachment receiver on the collar, at all.

OBJECTS AND FEATURES OF THE INVENTION

A primary object and feature of the present invention is to provide a system overcoming the above-mentioned problem.

It is a further object and feature of the present invention to provide such a system that is easy and safe.

A further primary object and feature of the present invention is to provide a system which allows a user to attach a leash to a pet's collar without having to remove gloves or mittens in cold climates.

It is a further object and feature of the present invention to provide a system which allows a user to attach or detach a leash to, or from, a pet's collar with one hand and without the need to "grab" the "D-ring" on the collar.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a leash system, relating to leashing a pet by a collar using one hand, comprising: two arms having a coupling end and a handle end wherein each coupling end comprises at least one bar structured and arranged to slide between the collar and the pet, and at least one arm connector structured and arranged to connect such at least one bar and such handle end; and a pivot between such two arms positioned to transfer forces on such handle end to such coupling end to open such coupling ends; wherein such coupling ends of such two arms comprise an open position and a closed position with respect to each other; wherein such at least one bar of one of such two arms is parallel to such at least one bar of the other of such two arms in both such open position and such closed position; wherein such at least one arm connector of one of such two arms is opposite to such at least one arm connector of the other of such two arms; and wherein each such at least one arm connector passes to opposite sides of the collar and each such at least one bar lies between the collar and the pet when such coupling ends are in such closed position and coupled to the collar.

Moreover, it provides such a leash system further comprising at least one spring structured and arranged to close such coupling ends. Additionally, it provides such a leash system further comprising at least one closure restrictor structured and arranged to restrict closure of such at least one collar coupler from complete closure. Also, it provides such a leash system wherein such at least one closure restrictor comprises at least one tab and slot in such pivot. In addition, it provides such a leash system wherein such at least one closure restrictor leaves a gap between such at least one bar of one of such two arms and such at least one bar of the other such two arms of between about four thousandths inch and about fifteen thousandths inch.

And, it provides such a leash system wherein such at least one closure restrictor leaves a gap between such at least one bar of one of such two arms and such at least one bar of the other such two arms of about four thousandths inch and about fifteen thousandths inch. Further, it provides such a leash system further comprising at least one leash coupler structured and arranged to couple with a leash. Even further, it provides such a leash system further comprising at least one swivel. Moreover, it provides such a leash system wherein such at least one swivel is between such at least one leash coupler and such handle end of one of such two arms.

In accordance with another preferred embodiment hereof, this invention provides a leash system, relating to leashing a pet by a collar using one hand, comprising: at least one collar coupler structured and arranged to couple with the collar of the pet; at least one coupler lever-handle structured and arranged to receive hand-application of a force; a pivot structured and arranged to pivot such at least one coupler lever-handle and such at least one collar coupler to lever such at least one collar coupler open upon application of the force upon such at least one coupler lever-handle; at least one closed-position restorer structured and arranged to restore such at least one collar coupler to a closed position when the force is removed from such at least one coupler lever-handle; at least one relative angle changer structured and arranged to change the relative angle between the collar and such at least one collar coupler as such at least one closed-position restorer closes such at least one collar coupler upon the collar; and at least one leash coupler structured and arranged to couple such collar coupler means and a leash.

Additionally, it provides such a leash system further comprising at least one coupler closing restrictor structured and arranged to restrict closure of such at least one collar coupler from complete closure. Also, it provides such a leash system wherein such at least one coupler closing restrictor leaves a gap in such at least one collar coupler of between about four thousandths inch and about fifteen thousandths inch.

In addition, it provides such a leash system wherein such at least one coupler closing restrictor leaves a gap in such at least one collar coupler of about four thousandths inch and about fifteen thousandths inch. And, it provides such a leash system wherein such at least one coupler closing restrictor comprises at least one tab and slot in such pivot. Further, it provides such a leash system wherein such at least one leash coupler comprises at least one swivel. Even further, it provides such a leash system wherein such at least one swivel is between such at least one leash coupler and such coupler lever-handle.

In accordance with another preferred embodiment hereof, this invention provides a leash system, relating to leashing a pet by a collar using one hand, comprising: collar coupler means for coupling with the collar of the pet; coupler lever-handle means for receiving hand-application of a force; pivot means for pivoting such coupler lever-handle means and such collar coupler means to lever such collar coupler means open upon application of the force upon such coupler lever-handle means; closed-position restorer means for restoring such collar coupler means to a closed position when the force is removed from such coupler lever-handle means; relative angle rotator means for rotating the relative angle between the collar and such collar coupler means as such closed-position restorer means closes such collar coupler means upon the collar; and leash coupler means for coupling such collar coupler means and a leash.

Even further, it provides such a leash system further comprising coupler closing restrictor means for restricting closure of such collar coupler means from complete closure. Even further, it provides such a leash system wherein such coupler closing restrictor means leaves a gap in such collar coupler means of between about four thousandths inch and about fifteen thousandths inch. Even further, it provides such a leash system wherein such coupler closing restrictor means leaves a gap in such collar coupler means of about four thousandths inch and about fifteen thousandths inch. Each and every novel feature, element, combination, step and/or method disclosed or suggested by this patent application.

BRIEF DESCRIPTION OF THE DRAWINGS

FIG. 7A shows a side view illustrating the "leash" attachment system of an alternately preferred embodiment of the present invention.

FIG. 7B shows a front view illustrating the "J-shaped" hooks of the leash-hook assembly of the leash-hooker of the leash-attachment system according to the alternately preferred embodiment of FIG. 7A.

FIG. 7C shows a top view illustrating the leash-hook assembly of the leash-hooker of the leash-attachment system according to the alternately preferred embodiment of FIG. 7A.

DETAILED DESCRIPTION OF THE BEST MODES AND PREFERRED EMBODIMENTS OF THE INVENTION

Generally, many people have pets that wear collars, and frequently may take those pets for walks in cold or hot climates. In order to place a leash on the pet, a person would have to remove any gloves from their hands, bend down and using two hands, attach the snap or hook of the leash to the "D-ring" on the collar of the pet. This can be a cumbersome task, especially in colder climates where a person must wear gloves or mittens on their hands to protect themselves from the cold, or even in hot climates where the metal "D-ring" would be hot to the touch. The present invention relates to providing a system for increased simplicity for attaching, or detaching, a leash to, or from, a pet's collar. More particularly the present invention relates to providing a system which allows a user to attach or detach a leash to, or from, a pet's collar using only one hand, without the need to remove mittens or gloves in colder climates, without the need to touch or grasp a hot metal "D-ring" or other method of attachment on a collar in hot climates, but simply attaching the leash directly to the collar itself. This allows a person to attach or detach a leash to, or from, a pet's collar without the need to remove gloves or mittens, without having to use one hand to hold onto the "D-ring" and the other to attach the leash by engaging the snap or hook with the "D-ring", and without the need to use the "D-ring" or other attachment receiver on the collar at all.

Figure 1:
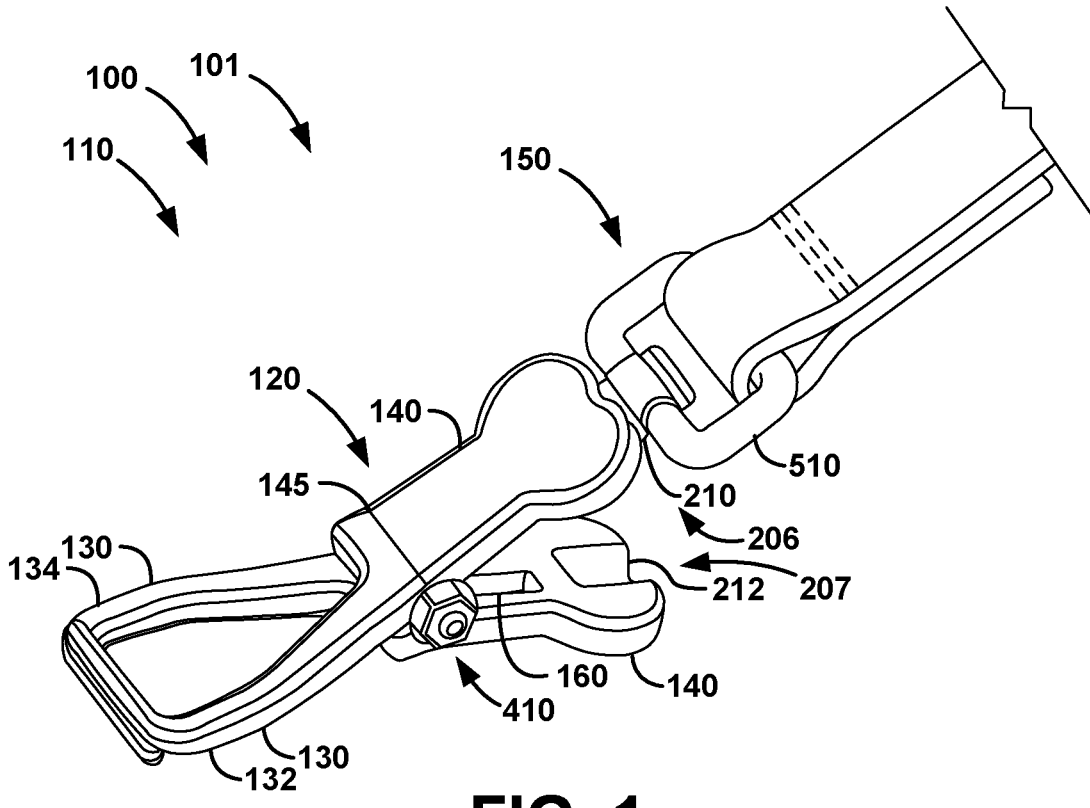
FIG. 1 shows a perspective view illustrating the leash-attachment system according to a preferred embodiment of the present invention.
Figure 5:
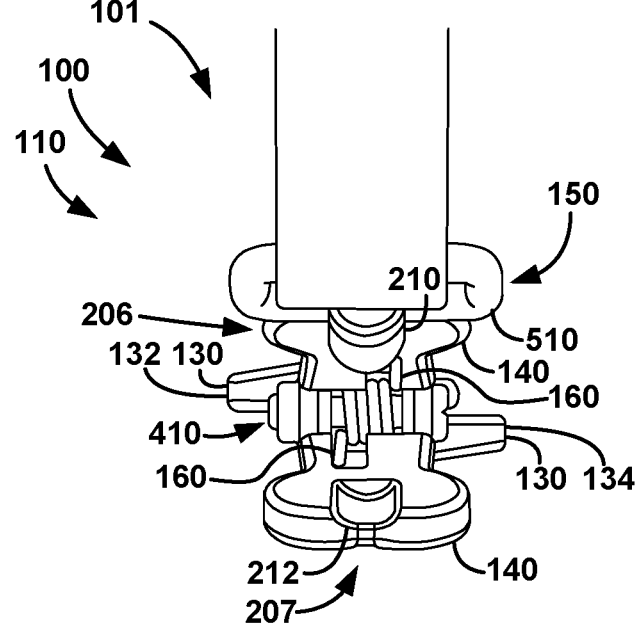
FIG. 5 shows a rear view, illustrating the leash-receiver of the leash attachment system, according to the preferred embodiment of FIG. 1.
Figure 2:
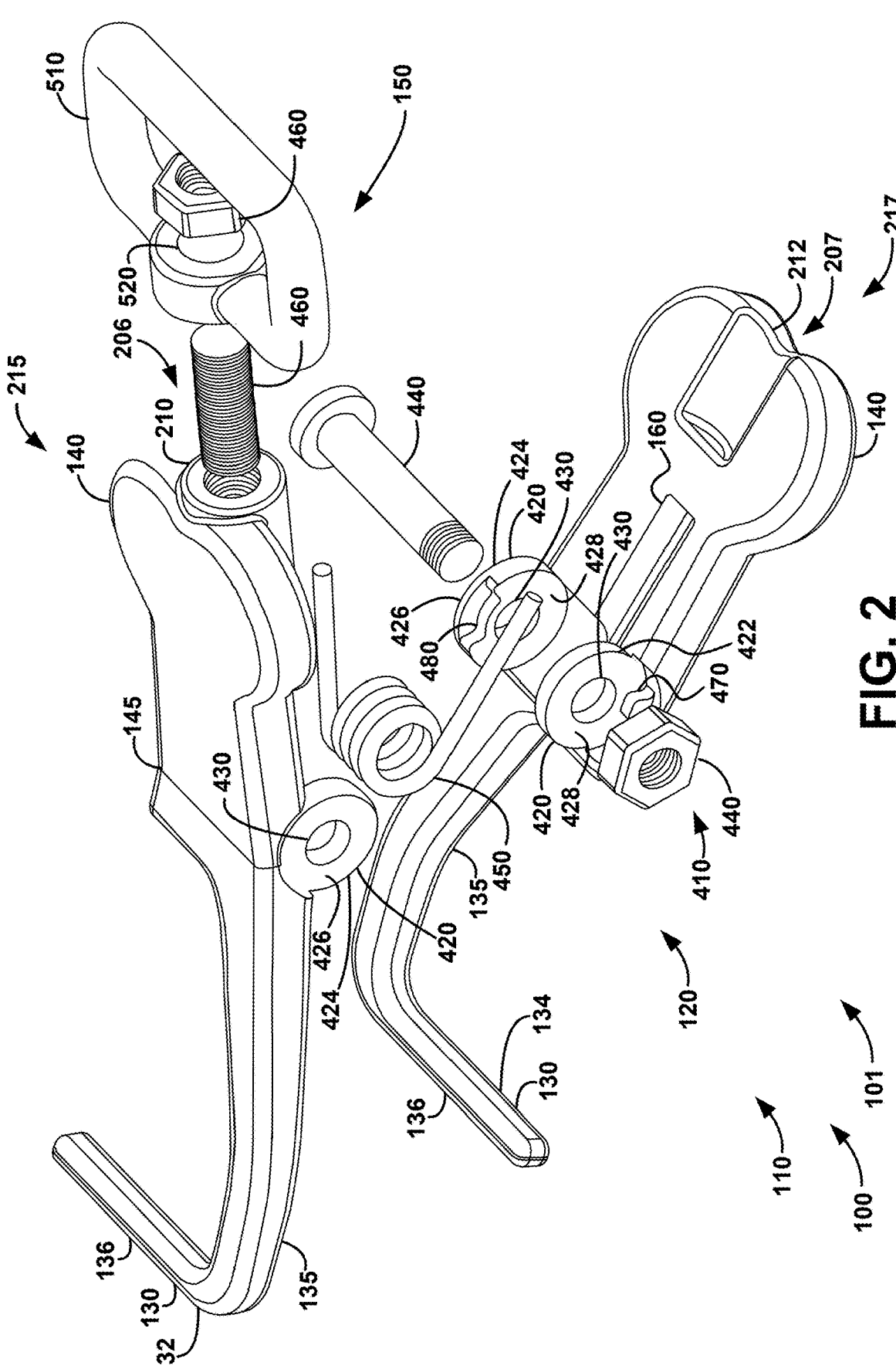
FIG. 2 shows an exploded perspective view, of leash attachment system, according to the preferred embodiment of FIG. 1.
Figure 3:
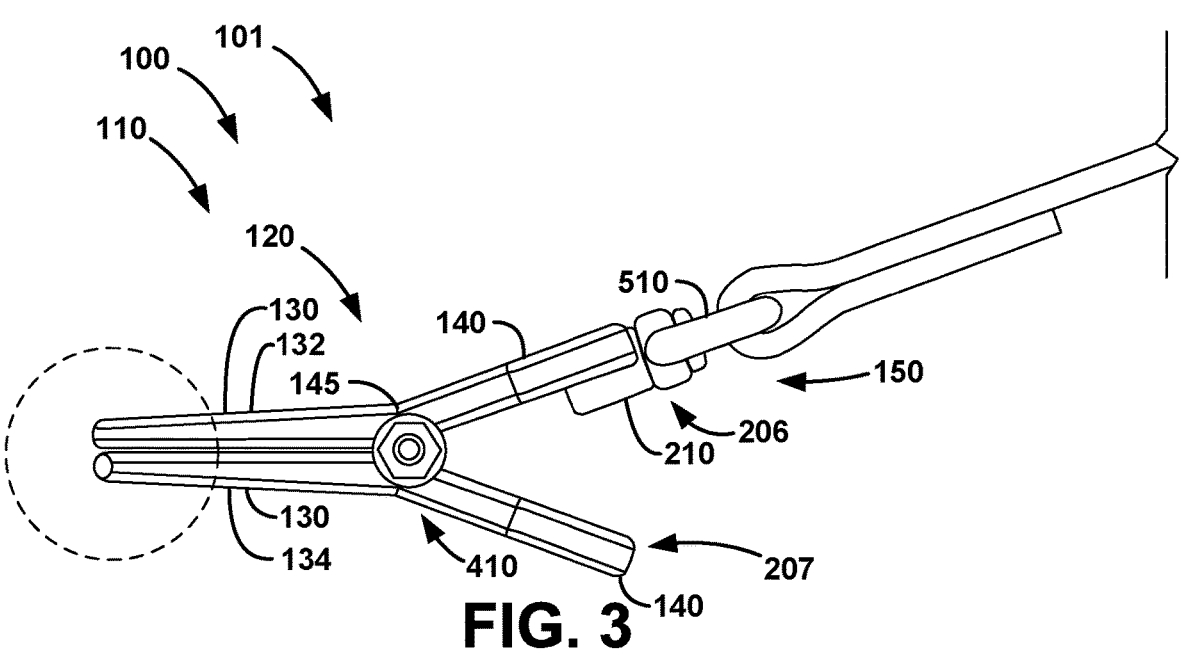
FIG. 3 shows a side view, illustrating the leash hooker and leash receiver of the leash attachment system, according to the preferred embodiment of FIG. 1.
Figure 4:
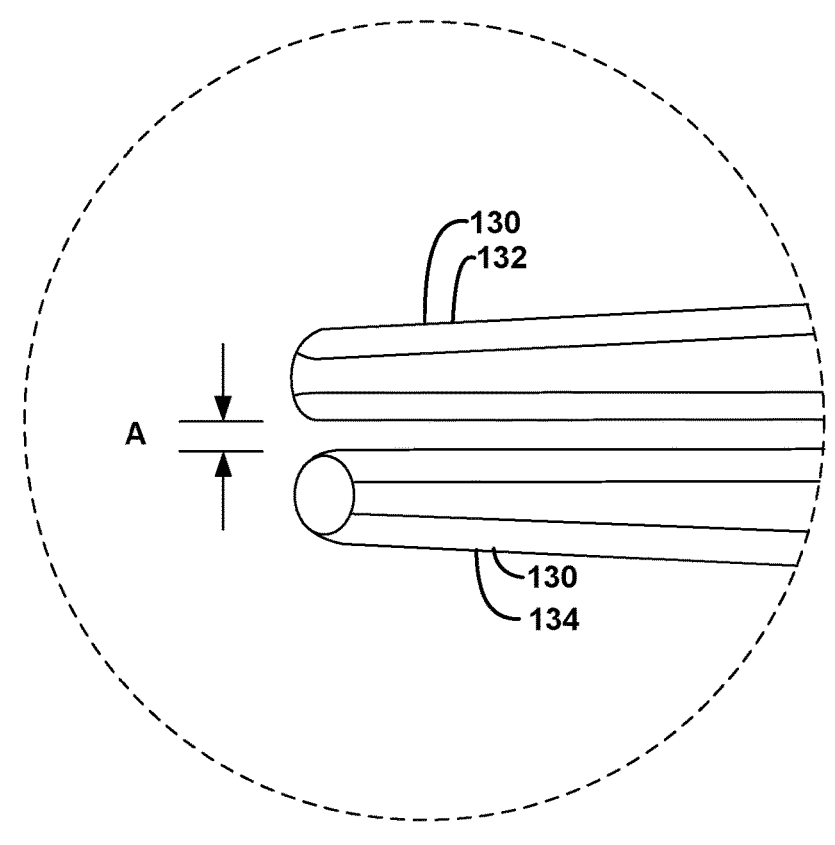
FIG. 4 shows a partial side view, illustrating only the end of the L-shaped "hooks" of the leash hooker of the leash attachment system, according to the preferred embodiment of FIG. 3.

FIG. 1 shows a perspective view illustrating the leash-attachment system 100 according to a preferred embodiment of the present invention. FIG. 2 shows an exploded perspective view, of leash attachment system 100, according to the preferred embodiment of FIG. 1. FIG. 3 shows a side view, illustrating the leash-hooker 110 and leash-receiver 150 of the leash attachment system 100, according to the preferred embodiment of FIG. 1. FIG. 4 shows a partial side view, illustrating only the end of the L-shaped "hooks" 130 of the leash hooker 110 of the leash attachment system 100, according to the preferred embodiment of FIG. 3. FIG. 5 shows a rear view, illustrating the leash-receiver 150 of the leash attachment system 100, according to the preferred embodiment of FIG. 1.

Leash-attachment system 100 preferably comprises at least one durable material, preferably durable metal, preferably aluminum, alternately preferably durable plastic, preferably nylon. Upon reading the teachings of this specification, those skilled in the art will now appreciate that, under appropriate circumstances, considering such issues as user preference, cost, available materials, new technology, etc., other materials, such as, for example, pot metal, die cast metal, steel, other metals, polyurethane, polypropylene, polyethylene, other plastics, etc., may suffice.

Leash-attachment system 100 preferably comprises leash-hooker 110 (at least embodying herein two arms having a coupling end and a handle end; and at lease embodying herein at least one collar coupler structured and arranged to couple with the collar of the pet; and at least embodying herein collar coupler means for coupling with the collar of the pet) and leash-receiver 150 (at least herein embodying at least one leash coupler structured and arranged to couple with a leash; and at least herein embodying at least one leash coupler structured and arranged to couple said collar coupler and a leash; and at least herein embodying collar coupler means for coupling said collar coupler and a leash), as shown. Leash-hooker 110 preferably comprises leash-hook assembly 120, as shown. Leash-hook assembly 120 preferably comprises L-shaped "hook" 130, preferably two L-shaped "hooks" 130 (at least herein embodying wherein each coupling end comprises at least one bar structured and arranged to slide between the collar and the pet), as shown. L-shaped "hook" 130 preferably comprises "hook" body 135 and "hook" bar 136. Hook" bar 136 is straight, as shown. Leash-hook assembly 120 preferably comprises a top L-shaped "hook" 132 and a bottom L-shaped "hook" 134, as shown. Each L-shaped "hook" 130 preferably further comprises receiver-base 140 contiguously molded or attached at the base of each L-shaped "hook" 130, as shown. "Hook" body 135 contiguously connects "hook" bar 136 to receiver-base 140, as shown. Each L-shaped "hook" 130 preferably further comprises spring-receiver groove 160 (see FIG. 2). Receiver-base 140 preferably comprises the same durable material as L-shaped "hooks" 130. Receiver-base 140 preferably comprises a shape, preferably one half of a dog bone shape, as shown. Upon reading the teachings of this specification, those skilled in the art will now appreciate that, under appropriate circumstances, considering such issues as manufacturer preference, user preference, cost, available materials, etc., other shapes, such as, for example, rectangular, square, oval, or any other decorative shape etc., may suffice.

Each L-shaped "hook" 130 and receiver-base 140 are contiguously molded or attached to each other at a pivot-point 145 (at least herein embodying wherein each coupling end comprises at least one arm connector structured and arranged to connect said at least one bar and said handle end), as shown. Pivot-point 145 is preferably located at the apex where L-shaped "hooks" 130 and receiver-bases 140 meet. Pivot-point 145 creates pivotability at a large enough angle to allow a user to pinch receiver-bases 140 (at least embodying herein at least one coupler lever-handle structured and arranged to receive hand application of a force; and at least embodying herein coupler lever-handle means for receiving hand application of a force) together to "open" or separate L-shaped "hooks" 130 apart far enough to fit around a pet's collar that is at least 1 inch in width, preferably greater than 90 degrees, as shown.

Leash-hook assembly 120 of leash-hooker 110 preferably further comprises leash-receiver securer 205 (Not shown). Leash receiver-securer 205 preferably comprises top leash-receiver securer 206 and bottom leash-receiver securer 207, as shown. Top leash-receiver securer 206 preferably comprises threaded tube 210. Threaded tube 210 is contiguously molded or attached to the opposite end 215 from the "hook" of top L-shaped "hook" 132, of receiver base 140, as shown. Bottom leash-receiver securer 207 preferably comprises tube-receiver groove 212, as shown. Tube-receiver groove 212 is preferably also located at the opposite end 217 from the "hook" of bottom L-shaped "hook" 134, as shown. Tube-receiver groove 212 preferably comprises a depth and width equal to the diameter of threaded tube 210 of top leash-securer receiver 206, as shown; therefore, when top L-shaped "hook" 132 and bottom L-shaped "hook" 134 of leash-hook assembly 120 are pinched together by a user, threaded tube 210 seats into tube-receiver groove 212, allowing the L-shaped "hooks" 130 to separate at a distance far enough for leash-hooker 110 to engage a pets collar (at least herein embodying wherein said coupling ends of said two arms comprise an open position and a closed position with respect to each other; and at least herein embodying wherein said at least one bar of one of said two arms is parallel to said at least one bar of the other of said two arms in both said open position and said closed position), as shown.

Top L-shaped "hook" 132 and bottom L-shaped "hook 134 are essentially identical to each other. Top L-shaped "hook" 132 differs from bottom L-shaped "hook" 134 in that top L-shaped "hook" 132 comprises threaded tube 210 and bottom L-shaped "hook" 134 comprises tube-receiver groove 212.

Leash-hook assembly 120 preferably further comprises pivot-assembly 410 (at least embodying herein a pivot between said two arms positioned to transfer forces on said handle end to said coupling end to open said coupling ends; and at least herein embodying a pivot structured and arranged to pivot said at least one coupler lever-handle and said at least one collar coupler to lever said at least one collar coupler open upon application of the force upon said at least one coupler lever-handle; and at least herein embodying pivot means for pivoting said coupler lever-handle means and said collar coupler means to lever said collar coupler means open upon application of the force upon said coupler level-handle means), as shown. Pivot-assembly 410 preferably comprises pivot-spacer 420, preferably two pivot-spacers 420 (at least herein embodying at least one closure restrictor structured and arranged to restrict closure of said at least one collar coupler from complete closure; and at least herein embodying at least one coupler closing restrictor structured and arranged to restrict closure of said at least one collar coupler from complete closure; and at least herein embodying coupler closing restrictor means for restricting closure of said collar coupler means from complete closure), as shown. Leash-hook assembly 120 preferably comprises a left pivot-spacer 422 and a right pivot-spacer 424. Left pivot-spacer 422 and right pivot-spacer 424 preferably comprise circular protrusions which are contiguously molded or attached to each L-shaped "hook" 130 at the apex of the angle of pivot-point 145. Each pivot-spacer 420 preferably comprises an outer surface 426 and an inner surface 428.

Left pivot-spacer 422 preferably is attached to L-shaped "hook" 130 such that the outer surface 426 is recessed from the edge of L-shaped "hook" 130 by a width that is essentially equal to the width of right pivot-spacer 424. Left-pivot spacer preferably further comprises pivot-stop tab 470 on the recessed outer surface 426, as shown. Right pivot-spacer 424 preferably comprises pivot-stop groove 480 on the inner surface 428 which is sized such that pivot-stop tab 470 of left pivot-spacer 422 seats inside it (at least herein embodying wherein said at least one closure restrictor comprises at least one tab and slot in said pivot; and at least herein embodying wherein said at least one coupler closing restrictor comprises at least one tab and slot in said pivot), as shown. Outer surface of right pivot-spacer 424 is preferably flush with the edge of L-shaped "hook" 130.

Each pivot-spacer 420 preferably further comprises fastener-receiver 430. Fastener-receiver 430 preferably comprises circular hole. Fastener-receiver 430 preferably further comprises fastener 440, preferably nut and bolt. Upon reading the teachings of this specification, those skilled in the art will now appreciate that, under appropriate circumstances, considering such issues as manufacturer preference, user preference, cost, available materials, future technology, etc., other fasteners, such as, for example, pins, screws, or any other appropriate fastener, etc., may suffice. Pivot-assembly 410 preferably further comprises torsion spring 450 (at least embodying herein at least one spring structured and arranged to close said coupling ends; and at least herein embodying at least one closed-position restorer structured and arranged to restore said at least one collar coupler to a closed position when the force is removed from said at least one coupler lever-handle; and at least herein embodying closed-position restorer means for restoring said collar coupler means to a closed position when the force is removed from said coupler lever-handle means), as shown. Torsion spring 450 preferably comprises a center opening with a diameter equal to that of fastener 440, as shown.

Leash-hooker 110 preferably further comprises leash-receiver 150, as shown. Leash-receiver 150 preferably comprises strap-eye 510, as shown. Strap-eye 510 preferably comprises a shape, preferably rectangular shape. Upon reading the teachings of this specification, those skilled in the art will now appreciate that, under appropriate circumstances, considering such issues as manufacturer preference, user preference, cost, available materials, etc., other shapes, such as, for example, circular, square, oval, or any other appropriate shape etc., may suffice. Strap-eye 510 preferably further comprises circular-pin receiver 520, as shown. Circular-pin receiver 520 preferably comprises a circular opening having the same diameter as threaded tube 210 on one of the long sides of the rectangle, opposite the side of the rectangle where a leash-strap is preferably threaded through the strap-eye, preferably folded over and preferably secured with a fastener, preferably a rivet (at least herein embodying leash coupler means for coupling said collar coupler means and a leash).

Leash-hook assembly 120 is assembled by placing top L-shaped "hook" 132 and bottom L-shaped "hook" 134 together in such a way that the pivot-stop tab 470 of top L-shaped "hook" 432 fits into pivot-groove 480 of bottom L-shaped "hook" 134 and pivot-stop tab 480 of bottom L-shaped "hook" 134 fits into pivot-stop groove 480 of top L-shaped "hook" 132, as shown. The pivot-stop tabs 470 and pivot-stop grooves 480 of pivot-spacers 420 stop L-shaped "hooks" 130 from completely closing, and leaving a gap A between L-shaped "hooks" 130 (at least herein embodying wherein said at least one closure restrictor leaves a gap between said at least one bar of one of said two arms and said at least one bar of the other said two arms of between about four thousandths inch and about fifteen thousandths inch), as shown. Gap A preferably comprises a distance of four one-thousandths of an inch to fifteen one-thousandths of an inch (at least herein embodying wherein said at least one coupler closing restrictor leaves a gap in said at least one collar coupler of between about four thousandths inch and about fifteen thousandths inch; and at least herein embodying wherein said closing restrictor means leaves a gap in said collar coupler means of between four thousandths inch and about fifteen thousandths inch).

Torsion spring 450 is preferably placed between top L-shaped "hook" 132 and bottom L-shaped "hook" 134 between pivot-spacers 420, such that the protruding ends of torsion spring 450 are facing backward toward leash-receiver 150 and seat snugly into spring-receiver groove 160, as shown. Fastener 440 is placed through fastener-receiver 430 of all four pivot-spacers of top L-shaped "hook" 132 and bottom L-shaped "hook" 134, as well as through the center of torsion spring 450, and secured in place, as shown.

Leash-receiver 150 preferably comprises fastener 460, as shown. Fastener 460 preferably comprises a threaded bolt and nut, as shown. Fastener 460 preferably comprises the same diameter as threaded tube 210. Leash receiver is attached to leash-hook assembly 120 by placing fastener 460 through circular-pin receiver 520 and threaded into threaded tube 210. Leash-receiver 150 is then secured in place by the nut of fastener 460, as shown. When leash-receiver 150 is securely attached through circular-pin receiver 520 of the strap-eye 510 and the threaded tube 210 of leash-hook assembly 120, leash-receiver 150 is able to swivel (at least embodying herein at least one swivel; and at least herein embodying wherein said at least one swivel is between said at least one leash coupler and said handle end of one of said two arms; and at least herein embodying wherein said at least one coupler comprises at least one swivel; and at least herein embodying wherein said at least one swivel is between said at least one leash coupler and said coupler lever-handle; and at least embodying herein at least one rotator means for rotating the relative angle between the collar and said collar coupler means as said closed-position restorer means closes said collar coupler means upon the collar) around the pivot created and to seat ninety degrees to create a sturdy grasp of the pet's collar.

Figure 6A:
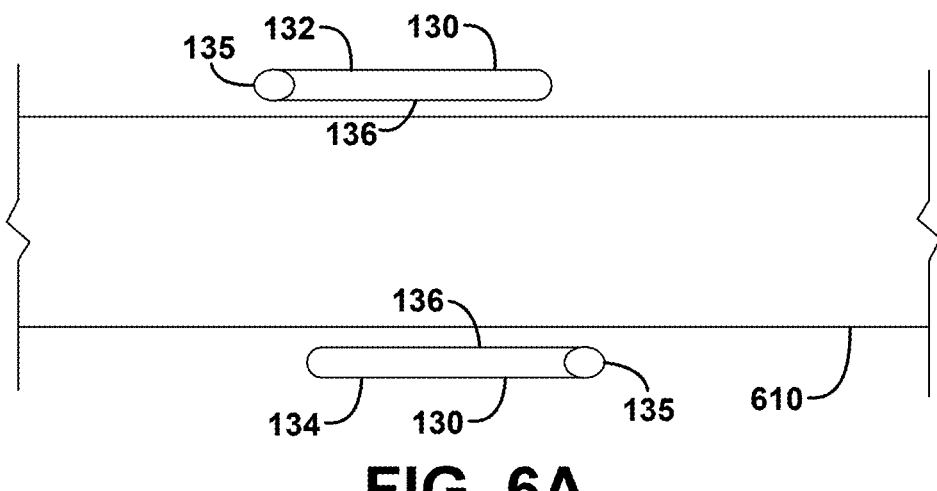
FIG. 6a shows a partial top view, illustrating the L-shaped "hooks" of the leash-hooker of the leash attachment system in an open position and beginning to engage a pet's collar, according to the preferred embodiment of FIG. 3
Figure 6B:
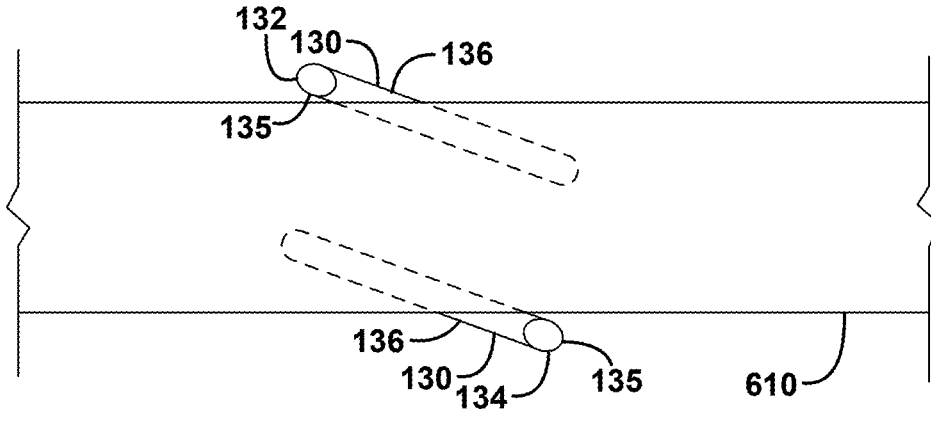
FIG. 6b shows a partial top view, illustrating the L-shaped "hooks" of the leash-hooker of the leash attachment system in a partially open and swiveled position engaging a pet's collar, according to the preferred embodiment of FIG. 3.
Figure 6C:
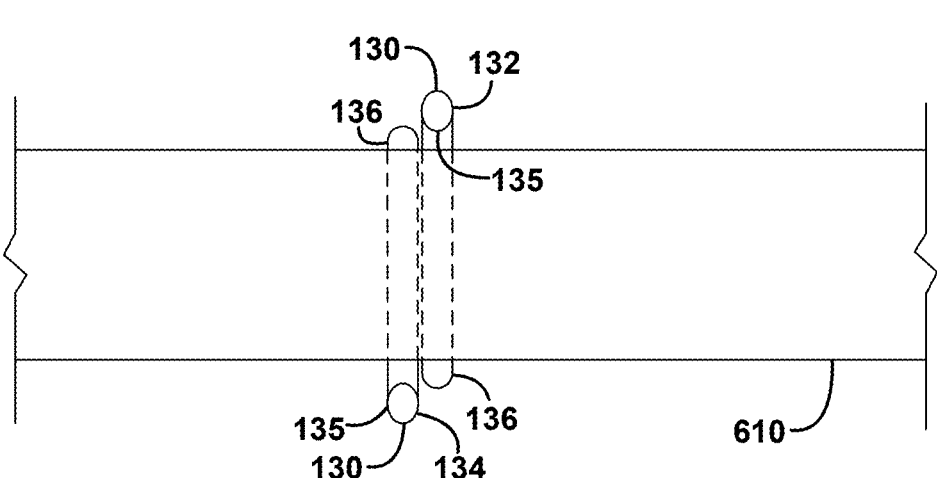
FIG. 6c shows a partial top view, illustrating the L-shaped "hooks" of the leash-hooker of the leash attachment system in a secured, fully closed and swiveled position around a pet's collar, according to the preferred embodiment of FIG. 3.

FIG. 6a shows a partial top view, illustrating the L-shaped "hooks" 130 of the leash-hooker 110 of the leash attachment system 100 in an open position and beginning to engage a pet's collar 610, according to the preferred embodiment of FIG. 3. FIG. 6b shows a partial top view, illustrating the L-shaped "hooks" 130 of the leash-hooker 110 of the leash attachment system 100 in a partially open and swiveled position engaging a pet's collar 610, according to the preferred embodiment of FIG. 3. FIG. 6c shows a partial top view, illustrating the L-shaped "hooks" 130 of the leash-hooker 110 of the leash attachment system 100 in a secured, fully closed and swiveled position around a pet's collar 610, according to the preferred embodiment of FIG. 3.

In use, a user would engage a pet's collar 610 with leash attachment system 100 by first pinching receiver bases 140 together, with one hand, to separate L-shaped "hooks" 130, as shown. Once separated, each L-shaped "hook" 130 is placed parallel to each side of the pet's collar 610, and gently lower the L-shaped "hooks" below the pet's collar 610 toward the pet's body (at least herein embodying wherein said at least one arm connector of one of said two arms is opposite to said at least one arm connector of the other of said two arms; and at least herein embodying wherein each said at least one arm connector passes to opposite sides of the collar and each said at least one bar lies between the collar and the pet when said coupling ends are in said closed position and coupled to the collar), as shown. The user then releases the receiver bases 140, which causes the torsion spring 450 to engage and allows the L-shaped "hooks" 130 to come together around the pet's collar 610, as shown. As the force is released from receiver bases 140, "hook" body 135 engages the pet's collar 610. The interaction between "hook" body 135 and pet's collar 610 results in a force being applied to "hook" body 135. It is the structure of this force which causes the rotation of hook assembly 120 at leash receiver 150. As the L-shaped "hooks" 130 come together around pet's collar 610, leash-hookers 110 will swivel approximately 90 degrees such that L-shaped "hooks" 130 are engaged with pet's collar 610 approximately 90 degrees from parallel to secure leash attachment system onto the pet's collar 610. Addtionally, when the receiver bases 140 are released and the L-shaped "hooks" 130 come together, the pivot-stop tabs 470 engage the pivot-stop grooves 480, preventing the L-shaped hooks 130 from closing completely such that L-shaped "hooks" 130 do not pinch the pet's skin or hair.

FIG. 7A shows a side view illustrating the leash-attachment system 100 of an alternately preferred embodiment of the present invention. FIG. 7B shows a front view illustrating the "L-shaped" hooks 130 of the leash-hook assembly 720 of the leash-hooker 110 of the leash-attachment system according to the alternately preferred embodiment of FIG. 7A. FIG. 7C shows a top view illustrating the leash-hook assembly 720 of the leash-hooker 110 of the leash-attachment system 700 according to the alternately preferred embodiment of FIG. 7A.

Leash-attachment system 100 preferably comprises at least one durable material, preferably durable metal, preferably forged steel, alternately preferably steel. Upon reading the teachings of this specification, those skilled in the art will now appreciate that, under appropriate circumstances, considering such issues as user preference, cost, available materials, new technology, etc., other materials, such as, for example, pot metal, die cast metal, steel, aluminum, other metals, polyurethane, polypropylene, polyethylene, other plastics, etc., may suffice.

Leash-attachment system 100 alternately preferably comprises leash-attachment 700. Leash-attachment 700 preferably comprises leash-hooker 110 (at least embodying herein two arms having a coupling end and a handle end; and at least herein embodying wherein each coupling end comprises at least one bar structured and arranged to slide between the collar and the pet; and at least herein embodying wherein each coupling end comprises at least one arm connector structured and arranged to connect said at least one bar and said at least one handle end; and at lease embodying herein at least one collar coupler structured and arranged to couple with the collar of the pet; and at least embodying herein collar coupler means for coupling with the collar of the pet) and leash-receiver 150 (at least herein embodying at least one leash coupler structured and arranged to couple with a leash; and at least herein embodying at least one leash coupler structured and arranged to couple said collar coupler and a leash; and at least herein embodying collar coupler means for coupling said collar coupler and a leash), as shown. Leash-hooker 110 preferably comprises leash-hook assembly 720, as shown. Leash-hook assembly 720 preferably comprises L-shaped "hook" 130, preferably two L-shaped "hooks" 130 (at least herein embodying wherein each coupling end comprises at least one bar structured and arranged to slide between the collar and the pet), as shown. Many of the features of leash-hook assembly 720 are repeated from leash-hook assembly 120, as shown. Leash-hook assembly 720 preferably comprises a top L-shaped "hook" 732 and a bottom L-shaped "hook" 734, as shown. Top L-shaped "hook" 732 and bottom L-shaped "hook" 734 differ from top L-shaped "hook" 132 and bottom L-shaped "hook" 134 in that the "L-shape" is altered to a curved "L-shape" such that it comprises more of a "fish-hook" shape.

Each L-shaped "hook" 130 preferably further comprises receiver-base 140 contiguously molded or attached at the base of each L-shaped "hook" 130, as shown. Each L-shaped "hook" 130 preferably further comprises spring-receiver groove 160 (see FIG. 2). Receiver-base 140 preferably comprises the same durable material as L-shaped "hooks" 130. Receiver-base 140 preferably comprises a shape, preferably one half of a dog bone shape, as shown. Upon reading the teachings of this specification, those skilled in the art will now appreciate that, under appropriate circumstances, considering such issues as manufacturer preference, user preference, cost, available materials, etc., other shapes, such as, for example, rectangular, square, oval, or any other decorative shape etc., may suffice.

Each L-shaped "hook" 130 and receiver-base 140 are preferably contiguously molded or attached to each other at a pivot-point 145 (at least herein embodying wherein each coupling end comprises at least one arm connector structured and arranged to connect said at least one bar and said handle end), as shown. Pivot-point 145 is preferably located at the apex where L-shaped "hooks" 130 and receiver-bases 140 meet. Pivot-point 145 preferably creates pivotability at a large enough angle to allow a user to pinch receiver-bases 140 (at least embodying herein at least one coupler lever-handle structured and arranged to receive hand application of a force; and at least embodying herein coupler lever-handle means for receiving hand application of a force) together to "open" or separate L-shaped "hooks" 130 apart far enough to fit around a cable, rope, chain or other similar type item that a user may need to hook to, preferably greater than 90 degrees, as shown.

Top L-shaped "hook" 732 and bottom L-shaped "hook 734 are preferably essentially identical to each other. Top L-shaped "hook" 732 preferably differs from bottom L-shaped "hook" 734 in that top L-shaped "hook" 732 preferably comprises threaded tube 210 and bottom L-shaped "hook" 734 preferably comprises tube-receiver groove 212, similarly to top L-shaped "hook" 132 and bottom L-shaped "hook" 134 (at least herein embodying wherein said coupling ends of said two arms comprise an open position and a closed position with respect to each other; and at least herein embodying wherein said at least one bar of one of said two arms is parallel to said at least one bar of the other of said two arms in both said open position and said closed position; and at least herein embodying wherein said at least one arm connector of one of said two arms is opposite to said at least one arm connector of the other of said two arms; and at least herein embodying wherein each said at least one arm connector passes to opposite sides of the collar and each said at least one bar lies between the collar and the pet when said coupling ends are in said closed position and coupled to the collar), (See FIG. 2).

Leash-hook assembly 720 preferably further comprises pivot-assembly 710 (at least embodying herein a pivot between said two arms positioned to transfer forces on said handle end to said coupling end to open said coupling ends; and at least herein embodying a pivot structured and arranged to pivot said at least one coupler lever-handle and said at least one collar coupler to lever said at least one collar coupler open upon application of the force upon said at least one coupler lever-handle; and at least herein embodying pivot means for pivoting said coupler lever-handle means and said collar coupler means to lever said collar coupler means open upon application of the force upon said coupler level-handle means), as shown. Pivot-assembly 710 preferably differs from pivot-assembly 410 in that pivot-assembly 710 preferably comprises pivot-spacer 420, preferably two pivot spacers 420, as shown. Pivot-assembly 710 preferably comprises a left pivot-spacer 722 (not shown) and a right pivot-spacer 724 (not shown). Left pivot-spacer 722 and right pivot-spacer 724 preferably comprise circular protrusions which are contiguously molded or attached to each L-shaped "hook" 130 at the apex of angle 145. Each pivot-spacer 420 preferably comprises an outer surface 726 and an inner surface 728; however, left pivot-spacer 722 and right pivot spacer 724 preferably comprise essentially identical smooth outer surfaces 726 and inner surfaces 728.

Left pivot-spacer 722 and right pivot-spacer 724 preferably are attached to L-shaped "hook" 130 such that the outer surface 726 is flush with the edge of L-shaped "hook" 130, as shown. Left-pivot spacer 722 and right pivot-spacer 724 preferably do not comprise pivot-stop tab 470 or pivot-stop groove 480, as shown. Therefore, pivot-spacers 420 do not prevent the L-shaped "hooks" 130 from completely closing, as shown. L-shaped "hooks" 130 close completely together, making full contact with one another without any gap A present, as shown.

Each pivot-spacer 420 preferably further comprises fastener-receiver 430. Fastener-receiver 430 preferably comprises circular hole. Fastener-receiver 430 preferably further comprises fastener, preferably nut and bolt. Upon reading the teachings of this specification, those skilled in the art will now appreciate that, under appropriate circumstances, considering such issues as manufacturer preference, user preference, cost, available materials, future technology, etc., other fasteners, such as, for example, pins, screws, or any other appropriate fastener, etc., may suffice. Pivot-assembly 410 preferably further comprises torsion spring 450, as shown. Torsion spring 450 preferably comprises a center opening with a diameter equal to that of fastener 440, as shown.

Torsion spring 450 is preferably placed between top L-shaped "hook" 732 and bottom L-shaped "hook" 734 between pivot-spacers 420, such that the protruding ends of torsion spring 450 are facing backward toward leash-receiver 150 and seat snuggly into spring-receiver groove 160, as shown. Fastener 440 is placed through fastener-receiver 430 of all four pivot-spacers of top L-shaped "hook" 132 and bottom L-shaped "hook" 134, as well as through the center of torsion spring 450, and secured in place, as shown.

Leash-attachment 700 of Leash-attachment system 100 preferably attaches in the same manner as leash-attachment 101, however, with the slight difference in the shape of L-shaped "hooks" 130 and the absence of pivot-stop tabs 470 and pivot-stop grooves 480 preventing full closure, along with the use of stronger materials (forged steel), leash-attachment 700 of leash attachment system 100 attaches more securely to cables, ropes, chains, etc. for use as a safety attachment (similar to a carabiner) for many different applications.

Although applicant has described applicant's preferred embodiments of this invention, it will be understood that the broadest scope of this invention includes modifications such as diverse shapes, sizes, and materials, as well as, non-conflicting combinations of features of various embodiments disclosed herein. Such scope is limited only by the below claims as read in connection with the above specification. Further, many other advantages of applicant's invention will be apparent to those skilled in the art from the above descriptions and the below claims.

What is claimed is:

1. A leash system, relating to leashing a pet by a collar using one hand, comprising:
   a) two arms each having a coupling end and a handle end, the two arms attached together forming a single pivot between the two arms to rotate the two arms and move the coupling ends apart;
   b) wherein each coupling end comprises
      i) at least one collar coupler structured and arranged to slide between the collar and the pet and each at least one collar coupler on each coupling end overlap each other, and ii) at least one arm connector structured and arranged to connect said at least one collar coupler and said handle end; and
   c) the single pivot between said two arms positioned to transfer forces applied with a single hand on said handle end to said coupling end to open said coupling ends;
   d) wherein said coupling ends of said two arms comprise an open position and a closed position with respect to each other;
   e) wherein said at least one collar coupler of each of said two arms share a common linear plane as said at least one collar coupler of the other of said two arms in both said open position and said closed position, as said at least one collar coupler of said at least two arms moves vertically away from the other said at least one collar coupler of said at least two arms in the open position so the collar can slide between a vertical gap formed in between the collar couplers in an open position;
   f) wherein said at least one collar coupler of one of said two arms is parallel to said at least one collar coupler of the other of said two arms and the two collar couplers overlap each other in the common linear plane in both said open position and said closed position;
   g) wherein said at least one arm connector of one of said two arms is opposite to said at least one arm connector of the other of said two arms;
   h) wherein each said at least one arm connector passes to opposite sides of the collar and each said at least one collar coupler lies between the collar and the pet when said coupling ends are in said closed position and coupled to the collar; and
   i) wherein the at least one collar coupler comprises at least one of a pair of L-shaped hooks or C-shaped hooks fixed laterally in relation to each other so as to overlap and open vertically for the hooks to slide over the collar without binding.

2. The leash system according to claim 1 further comprising at least one spring structured and arranged to close said coupling ends.

3. The leash system according to claim 1 further comprising at least one closure restrictor structured and arranged to restrict closure of said at least one collar coupler from complete closure.

4. The leash system according to claim 3 wherein said at least one closure restrictor comprises at least one tab and slot in said pivot.

5. The leash system according to claim 3 wherein said at least one closure restrictor leaves a gap between said at least one bar of one of said two arms and said at least one bar of the other said two arms of between about four thousandths inch and about fifteen thousandths inch.

6. The leash system according to claim 1 further comprising at least one leash coupler structured and arranged to couple with a leash.

7. The leash system according to claim 6 further comprising at least one swivel.

8. The leash system according to claim 7 wherein said at least one swivel comprises freedom of rotation between said at least one leash coupler relative to said handle end of one of said two arms.

* * * * *

5